(12) United States Patent  
Togashi et al.

(10) Patent No.: US 7,286,715 B2  
(45) Date of Patent: Oct. 23, 2007

(54) QUANTIZATION APPARATUS, QUANTIZATION METHOD, QUANTIZATION PROGRAM, AND RECORDING MEDIUM

(75) Inventors: Haruo Togashi, Kanagawa (JP); Akira Sugiyama, Kanagawa (JP); Takuya Kitamura, Tokyo (JP)

(73) Assignee: Sony Corporation, Tokyo (JP)

( * ) Notice: Subject to any disclaimer, the term of this patent is extended or adjusted under 35 U.S.C. 154(b) by 838 days.

(21) Appl. No.: 10/473,029

(22) PCT Filed: Mar. 28, 2002

(86) PCT No.: PCT/JP02/03061

§ 371 (c)(1), (2), (4) Date: Sep. 25, 2003

(87) PCT Pub. No.: WO02/080573

PCT Pub. Date: Oct. 10, 2002

(65) Prior Publication Data

US 2004/0086192 A1 May 6, 2004

(51) Int. Cl.  
*G06K 9/36* (2006.01)

(52) U.S. Cl. .................................... 382/251

(58) Field of Classification Search ........ 382/232–233, 382/236, 238, 239, 240, 246, 248, 250, 251; 375/240.12, 240.16, 240.17, 240.19; 348/394.1, 348/395.1, 403.1, 412.1, 415.1, 420.1  
See application file for complete search history.

(56) References Cited

U.S. PATENT DOCUMENTS 5,754,699 A * 5/1998 Sugahara .................... 382/233

6,208,692 B1 * 3/2001 Song et al. ............. 375/240.19  
6,434,196 B1 * 8/2002 Sethuraman et al. ... 375/240.12  
6,560,371 B1 * 5/2003 Song et al. ................. 382/240

FOREIGN PATENT DOCUMENTS

JP 6-22292 1/1994  
JP 10-304362 11/1998

* cited by examiner

Primary Examiner—Jose L. Couso  
(74) Attorney, Agent, or Firm—Frommer Lawrence & Haug LLP; William S. Frommer; Paul A. Levy

(57) ABSTRACT

A rounding accuracy of DCT coefficients that are quantized is dynamically varied with a simple structure. As a result, an encoding noise is effectively suppressed and the picture quality is prevented from being deteriorated. DCT coefficients of which a picture signal is transformed by DCT are input to a quantizing circuit 30. The quantizing circuit 30 quantizes the DCT coefficients with a quantizer matrix and supplies the quantized DCT coefficients to a multiplying device 33 through an absolute value circuit 31. A quantizer scale value based on the generated code amount of the entire screen is converted into an invert value thereof and then supplied to a multiplying device 33. In addition, an M value designating circuit 38 designates a value M as a parameter with which a rounding accuracy of DCT coefficients that are quantized is controlled according to a quantizer scale value. An adding device 34 adds the value M to an output of the multiplying device 33. A five-bit shifting circuit 35 rounds off a decimal part. At that point, as the quantizer scale value becomes large, the rounding accuracy of DCT coefficients that are quantized is designated so that the round off direction becomes large. Thus, the DCT coefficients are quantized so that the amplitude is not increased. As a result, the encoding noise can be suppressed.

6 Claims, 6 Drawing Sheets

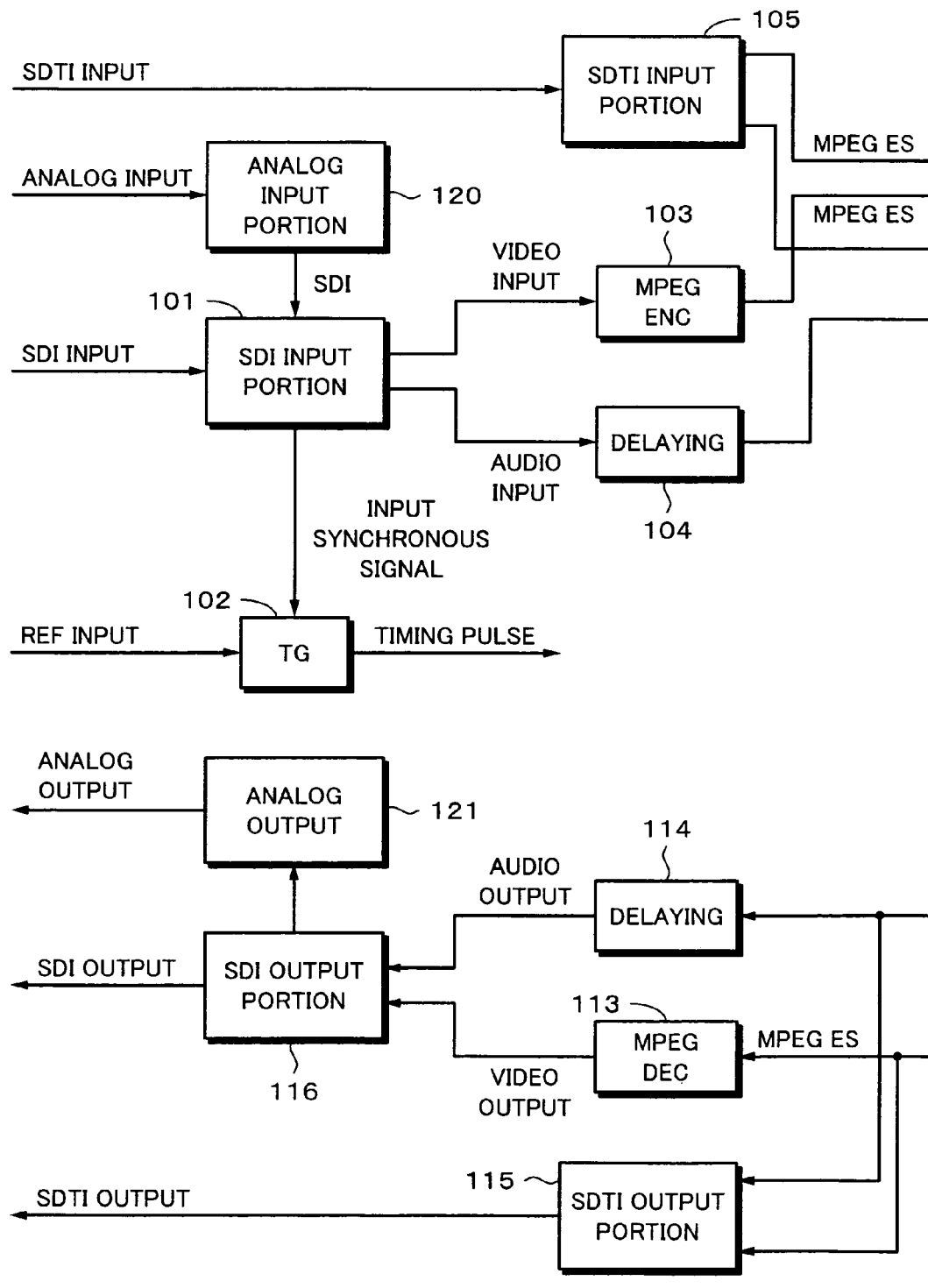

Fig. 6

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 48 |
| 26 | 27 | 29 | 34 | 38 | 46 | 56 | 69 |
| 27 | 29 | 35 | 38 | 46 | 56 | 69 | 83 |

…

QUANTIZATION APPARATUS, QUANTIZATION METHOD, QUANTIZATION PROGRAM, AND RECORDING MEDIUM

TECHNICAL FIELD

The present invention relates to a quantizing apparatus, a quantizing method, a quantizing program, and a recording medium for quantizing a picture signal and compression-encoding the quantized picture signal.

BACKGROUND ART

As typified by a digital VTR (Video Tape Recorder), a data recording and reproducing apparatus that records a digital video signal and a digital audio signal to a recording medium and reproducing them therefrom is known. Since the data amount of a digital video signal is huge, it is normally compression-encoded according to a predetermined system and recorded on a recording medium. In recent years, the MPEG2 (Moving Picture Experts Group 2) system is known as a standard compression-encoding system.

In the MPEG2, data obtained by a prediction encoding method using a motion detection and a DCT (Discrete Cosine Transform) method is quantized and compression-encoded. In addition, by a variable length code encoding method, the compression efficiency is improved.

Each frame is compression-encoded by the DCT method. For example, an input digital video signal is block-segmented in a predetermined size. A DCT-calculation is performed for each segmented block. Coefficients obtained by the DCT-calculation are quantized. A quantized representative value is encoded with a variable length code and then compression-encoded. The rounding accuracy of coefficients quantized in the DCT-calculation has been predetermined. The rounding accuracy is for example the four cut and five count method (which is a rounding method for counting five and over as a unit and cutting away the rest), the five cut and six count method (which is a rounding method for counting six and over as a unit and cutting away the rest), or the rounding off method.

When coefficients are quantized with a fixed rounding accuracy, it is difficult to effectively compression-encode both a picture that can be easily quantized and a picture that cannot be easily quantized.

On the other hand, as one example of a method for dynamically varying the rounding accuracy of coefficients that are quantized, for example Japanese Patent Laid-Open Publication No. HEI 10-304362 discloses a method for varying the rounding accuracy of coefficients that are quantized corresponding to the size of the amplitude thereof. As another example, Japanese Patent Laid-Open Publication No. HEI 10-304363 discloses a method for varying the rounding accuracy of DCT coefficients that are quantized corresponding to a frequency component thereof. However, by those methods, it is inevitable that an encoding noise causes the picture quality to deteriorate.

Thus, an object of the present invention is to provide a quantizing apparatus, a quantizing method, a quantizing program, and a recording method that allow the rounding accuracy of coefficients that are quantized to be dynamically varied with a simple structure, an encoding noise to be effectively suppressed, a picture quality to be prevented from being deteriorated.

DISCLOSURE OF THE INVENTION

To solve the forgoing problem, the present invention is a quantizing apparatus, comprising: rounding accuracy designating means for designating a quantizer threshold value in multiple steps according to a designated quantizer scale value; and quantizing means for quantizing a picture signal based on the designated quantizer scale value and the quantizer threshold value designated by the rounding accuracy designating means.

The present invention is a quantizing method, comprising the steps of: designating a quantizer threshold value in multiple steps according to a designated quantizer scale value; and quantizing a picture signal based on the designated quantizer scale value and the quantizer threshold value designated at the rounding accuracy designating step.

The present invention is a quantizing program for causing a computer apparatus to execute a quantizing method for quantizing a picture signal, the quantizing method comprising the steps of: designating a quantizer threshold value in multiple steps according to a designated quantizer scale value; and quantizing a picture signal based on the designated quantizer scale value and the quantizer threshold value designated at the rounding accuracy designating step.

The present invention is a recording medium on which a quantizing program that causes a computer apparatus to execute a quantizing method for quantizing a picture signal has been recorded, the quantizing method comprising the steps of: designating a quantizer threshold value in multiple steps according to a designated quantizer scale value; and quantizing a picture signal based on the designated quantizer scale value and the quantizer threshold value designated at the rounding accuracy designating step.

As was described above, according to the present invention, since a picture signal is quantized based on a designated quantizer scale value and a quantizer threshold value designated in multiple steps according thereto, the quantizer scale value is designated according to a characteristic of a picture. Thus, the rounding accuracy of coefficients that are quantized is controlled according to a characteristic of a picture.

BRIEF DESCRIPTION OF DRAWINGS

FIG. 1A and FIG. 1B are block diagrams showing a structure of an example of a digital VTR according to an embodiment of the present invention;

FIG. 6 is a schematic diagram showing an example of weighting coefficients for coefficients of a DCT block.

BEST MODES FOR CARRYING OUT THE INVENTION

Next, an embodiment of the present invention will be described. Video data is block-segmented. Each block is transformed by the DCT (Discrete Cosine Transform)

method. As a result, DCT coefficients are obtained. The obtained DCT coefficients are quantized. As a result, video data is compressed-encoded. According to the present invention, when video data is compressed-encoded in such a manner, the rounding accuracy of DCT coefficients that are quantized is controlled according to a quantizer scale value, namely a divisor by which the DCT coefficients are divided.

The embodiment that will be described in the following is a preferred embodiment of the present invention. Although various preferable limitations are added to the embodiment, in the following description, the scope of the present invention should not be limited to the embodiment unless it is described that they restrict the present invention.

Figure 1B:
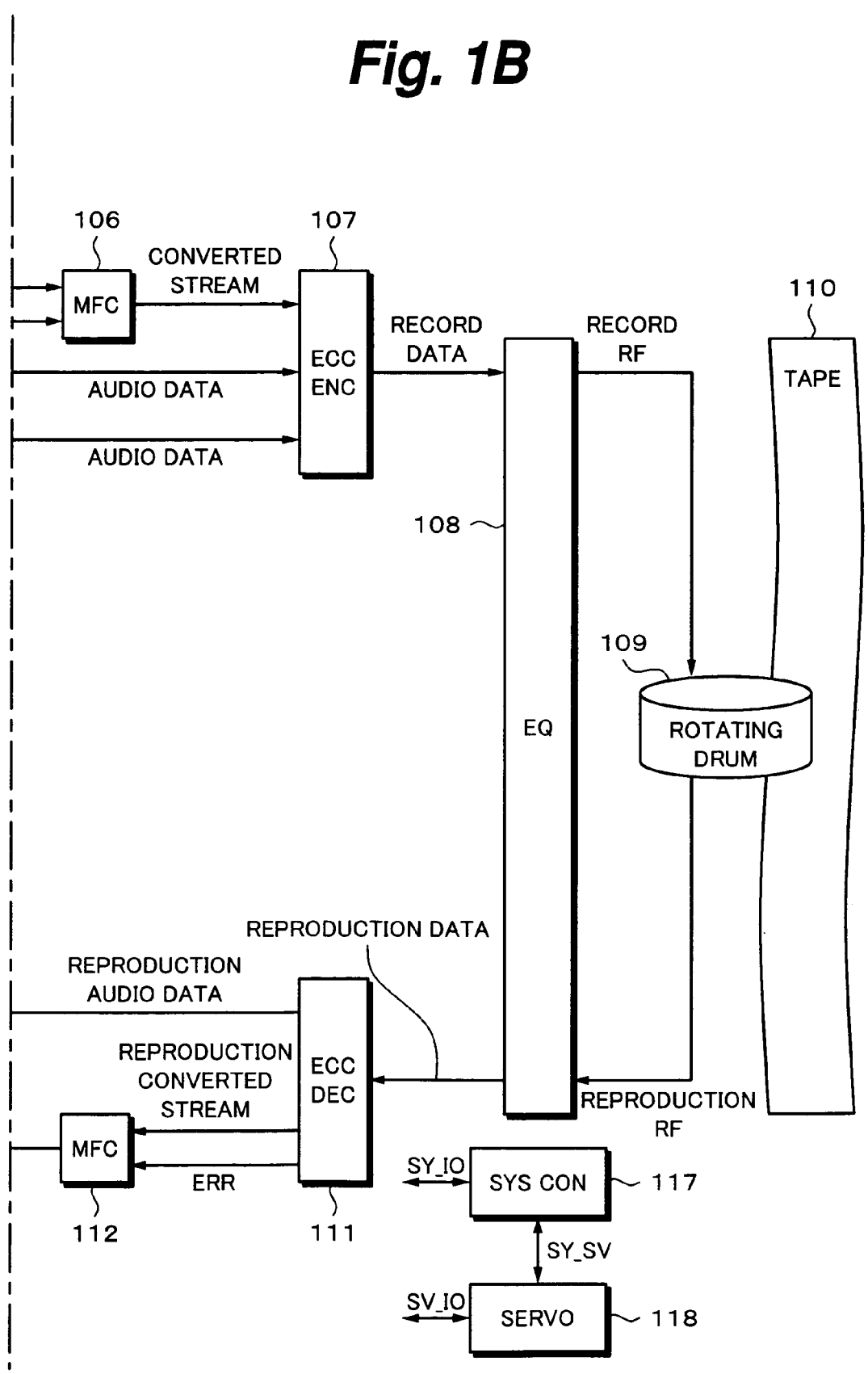

FIG. 1A and FIG. 1B show a structure of an example of a digital VTR according to an embodiment of the present invention. In the digital VTR, a digital video signal that has been compression-encoded according to the MPEG system is directly recorded on a recording medium.

First of all, a structure and a process operation of a recording system of the digital VTR will be described. Signals that are input from the outside to the recording system are two types of serial digital interface signals that are an SDI (Serial Data Interface) signal and an SDTI (Serial Data Transport Interface) signal and an external reference signal REF that is a control signal.

An SDI is an interface prescribed by the SMPTE. The SDI transmits a (4:2:2) component video signal, a digital audio signal, and additional data. An SDTI is an interface that transmits an MPEG elementary stream (hereinafter referred to as MPEG ES) that is a stream of which a digital video signal has been compression-encoded according to the MPEG system. An ES is composed of 4:2:2 components. As described above, an ES is a stream whose pictures are all I pictures and that has a relation of 1 GOP=1 picture. In the SDTI-COP (Content Package) format, an MPEG ES is divided into access units and packed in a packet that corresponds to a frame. In the SDTI-CP, a sufficient transmission band (27 MHz or 36 MHz as a clock rate or 270 Mbps or 360 Mbps as a stream bit rate). In one frame period, an ES can be transmitted in the state of a burst.

The SDI signal transmitted by the SDI is input to an SDI input portion 101. The SDI input portion 101 converts the supplied SDI signal from a serial signal into a parallel signal and outputs the parallel signal. In addition, the SDI input portion 101 extracts an input synchronous signal that is an input phase reference from the SDI signal and outputs the extracted synchronous signal to a timing generator TG 102.

The SDI input portion 101 separates a video signal and an audio signal from the converted parallel signal. The separated video input signal and audio input signal are output to an MPEG encoder 103 and a delaying circuit 104, respectively.

The timing generator TG 102 extracts a reference synchronous signal from an input external reference signal REF. The timing generator TG generates a timing signal that is necessary for the digital VTR in synchronization with a designated one of the reference synchronous signal extracted from the external reference signal REF and the input synchronous signal supplied from the SDI input portion 101. The timing generator TG 102 supplies the timing signal as timing pulses to each block of the digital VTR.

The MPEG encoder 103 transforms the input video signal into coefficient data according to the DCT method, quantizes the coefficient data, and encodes the quantized coefficient data with a variable length code. The data that has been encoded with the variable length code (VLC) is output as an elementary stream (ES) according to the MPEG2 system from the MPEG encoder 103. The output is supplied to a first input terminal of a multi-format converter 106 on the recording side (hereinafter referred to as recording side MFC 106).

The delaying circuit 104 functions as a delay line so that the input audio signal as non-compressed data is compensated with the delay in a process for the video signal that is output from the MPEG encoder 103.

The audio signal that has been delayed by the delaying circuit 104 is output to an ECC encoder 107. That is because in the digital VTR according to the embodiment, the audio signal is treated as a non-compressed signal.

The SDTI signal that is transmitted from the outside by the SDTI is input to an SDTI input portion 105. The SDTI signal is synchronously detected by the SDTI input portion 105. The detected SDTI signal is temporarily stored in a buffer. In the buffer, an elementary stream is extracted from the SDTI signal. The extracted elementary stream is supplied to a second input terminal of the recording side MFC 106. The synchronous signal that has been synchronously detected is supplied to the forgoing timing generator TG 102 (not shown).

The SDTI input portion 105 extracts a digital audio signal from the input SDTI signal. The extracted digital audio signal is supplied to the ECC encoder 107.

In such a manner, the digital VTR according to the embodiment can directly input the MPEG ES independently from the base band video signal that is input from the SDI input portion 101.

The recording side MFC circuit 106 has a stream converter and a selector. The recording side MFC circuit 106 selects one of the MPEG ES supplied from the SDI input portion 101 and the MPEG ES supplied from the SDTI input portion 105. In addition, the recording side MFC circuit 106 collects DCT coefficients of a plurality of DCT blocks that compose one macro block corresponding to frequency components and rearranges them in the order from the lowest frequency components to the highest frequency components. Hereinafter, a stream of which coefficients of an MPEG ES have been rearranged is referred to as converted elementary stream. When the MPEG ES is rearranged, when a picture is search-reproduced, as many DC coefficients and low order AC coefficient can be obtained as possible. Thus, the rearrangement of the MPEG ES contributes to the improvement of the picture quality of a search picture. The converted elementary stream is supplied to the ECC encoder 107.

A large capacity main memory (not shown) is connected to the ECC encoder 107. In addition, the ECC encoder 107 includes a packing and shuffling portion, an audio outer code encoder, a video outer code encoder, an inner code encoder, an audio shuffling portion, a vide shuffling portion, and so forth. Moreover, the ECC encoder 107 includes a circuit that adds an ID to each sync block and a circuit that adds a synchronous signal. According to a first embodiment of the present invention, as an error correction code for a video signal and an audio signal, a product code is used. With a product code, a video signal or an audio signal is encoded with an outer code in the vertical direction of a two-dimensional array. In addition, the video signal or the audio signal is encoded with an inner code in the horizontal direction of the two-dimensional array. As a result, data symbols are dually encoded. As the outer code and inner code, the Reed-Solomon code is used.

The converted elementary stream that is output from the MFC circuit 106 is supplied to the ECC encoder 107. In addition, the audio signals that are output from the SDTI input portion 105 and the delaying circuit 104 are supplied to the ECC encoder 107. The ECC encoder 107 shuffles the supplied converted elementary stream and the audio signals and encodes the shuffled stream and signal with the error correction code, adds an ID and a synchronous signal to each sync block, and outputs the resultant data as record data.

The record data that is output from the ECC encoder 107 is converted into a record RF signal by an equalizer EQ 108 that includes a recording amplifier. The record RF signal is supplied to a rotating drum 109. On the rotating drum 109, rotating heads are disposed in a predetermined manner. The rotating drum 109 records the RF signal on a magnetic tape 110. On the rotating drum 109, in reality, a plurality of magnetic heads are disposed with different azimuths that form adjacent tracks.

When necessary, a scrambling process may be performed for the record data. In addition, when record data is recorded, it may be digitally modulated. Moreover, virtual response class 4 and Viterbi code may be used. The equalizer 108 includes a recording side structure and a reproducing side structure (namely, the equalizer 108 is shared by the recording side and the reproducing side).

Next, a structure and a process operation of a reproducing system of the digital VTR will be described. When a reproduction operation of the digital VTR is performed, a reproduction signal is reproduced form the magnetic tape 110 by the rotating drum 109. The reproduction signal is supplied to the reproducing side structure of the equalizer 108 that includes a reproducing amplifier and so forth. The equalizer 108 equalizes the reproduction signal and trims the wave shape thereof. When necessary, the reproduction signal is digitally modulated and Viterbi-decoded. An output of the equalizer 108 is supplied to an ECC decoder 111.

The ECC decoder 111 performs the reverse process of the forgoing ECC encoder 107. The ECC decoder 111 includes a large capacity main memory, an inner code decoder, an audio deshuffling portion, a video deshuffling portion, and an outer code decoder. In addition, the ECC decoder 111 includes a video deshuffling portion and depacking portion and a data interpolating portion. Moreover, the ECC decoder 111 includes an audio AUX separating portion and an audio data interpolating portion.

The ECC decoder 111 synchronously detects the reproduction data, detects a synchronous signal added at the beginning of a synchronous block, and extracts the synchronous block from the reproduction data. Each sync block of the reproduction data is corrected with the inner code as an error correction code. Thereafter, an ID interpolating process is performed for each sync block. The reproduction data whose ID has been interpolated is separated into video data and audio data. A deshuffling process is performed for each of the video data and the audio data that have been shuffled when they have been recorded. Each of the deshuffled video data and audio data is error-corrected with the outer code.

When data has an error that exceeds the error correcting performance of the ECC decoder 111 and that it cannot correct the error, the ECC decoder 111 sets an error flag to the data. When video data has an error, the ECC decoder 111 outputs a signal ERR that represents data that has an error.

The reproduction audio data that has been error-corrected is supplied to an SDTI output portion 115. In addition, a delaying circuit 114 delays the reproduction audio data by a predetermined time period and supplies the delayed reproduction audio data to an SDI output portion 116. The delaying circuit 114 is disposed so that a delay of the video data by an MPEG decoder 113 that will be described is compensated.

On the other hand, the video data that has been error-corrected is supplied as a reproduction converted elementary stream to a reproducing side MFC circuit 112. In addition, the forgoing signal ERR is supplied to the reproducing side MFC circuit 112. The reproducing side MFC circuit 112 performs the reverse process of the forgoing recording side MFC 106. The reproducing side MFC circuit 112 includes a stream converter. The steam converter performs the reverse process of the recording side stream converter. In other words, the stream converter rearranges DCT coefficients that have been arranged in the order from the lowest frequency components to the highest frequency components over DCT blocks to DCT coefficients of each DCT block. As a result, the reproduction signal is converted into an elementary stream according to the MPEG2. At that point, when the signal ERR is supplied from the ECC decoder 111, the reproducing side MFC circuit 112 rewrites the corresponding data so that it completely complies with the MPEG2 and outputs the resultant data.

An MPEG ES that is output from the reproducing side MFC circuit 112 is supplied to the MPEG decoder 113 and the SDTI output portion 115. The MPEG decoder 113 decodes the supplied MPEG ES and restores it to the original video signal as a non-compressed signal. In other words, the MPEG decoder 113 performs an inversely quantizing process and an inverse DCT process for the supplied MPEG ES. The decoded video signal is supplied to the SDI output portion 116.

As was described above, the audio data that has been separated from the video data by the ECC decoder 111 is supplied to the SDI output portion 116 through the delaying circuit 114. The SDI output portion 116 maps the supplied video data and audio data in an SDI format and converts them into an SDI signal having a data structure of the SDI format. The SDI signal is output to the outside.

On the other hand, as was described above, the audio data that has been separated from the video data by the ECC decoder 111 is supplied to the SDTI output portion 115. The SDTI output portion 115 maps the video data and audio data as the elementary stream in the SDTI format, converts them into the SDTI signal having a data structure of the SDTI format, and outputs the SDTI signal to the outside.

A system controller 117 (abbreviated as a sys con 117 in FIG. 1A and FIG. 1B) is composed of for example a micro computer. The system controller 117 communicates with each block using a signal SY_IO and controls all operations of the digital VTR. A servo 118 communicates with the system controller 117 using a signal SY_SV and controls traveling of the magnetic tape 110 and driving of the rotating drum 109.

Figure 2:
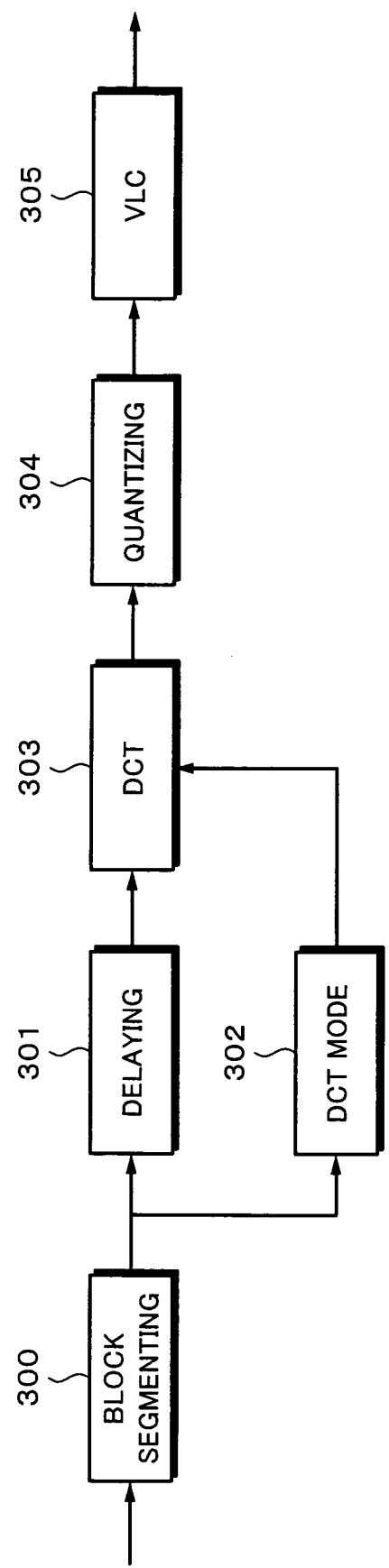
FIG. 2 is a block diagram showing an outline of a structure of an example of an MPEG encoder.

FIG. 2 shows an outline of a structure of an example of the MPEG encoder 103 of the digital VTR shown in FIG. 1. The MPEG encoder 103 comprises a block segmenting circuit 300, a delaying circuit 301, a DCT mode selecting circuit 302, a DCT circuit 303, a quantizing circuit 304, and a variable length code (VLC) encoding circuit 305.

The digital video signal supplied to the MPEG encoder 103 is converted into raster blocks by the block segmenting circuit 300. The raster blocks are divided into DCT blocks so that a DCT process can be performed. Each DCT block is composed of a matrix of for example eight pixels× eight lines that are made of one DC component and 63 AC components.

Data that is output as DCT blocks one at a time from the block segmenting circuit 300 is delayed by the delaying circuit 301 for a predetermined amount. The delayed data is supplied to the DCT circuit 303 and the DCT mode selecting circuit 302. The DCT mode selecting circuit 302 selects a field mode or a frame mode in which the DCT circuit 303 performs the DCT. In the field mode, the DCT circuit 303 performs the DCT for each field. On the other hand, in the frame mode, the DCT circuit 303 performs the DCT for each frame. A mode selection signal that is output from the DCT mode selecting circuit 302 is supplied to the DCT circuit 303.

The DCT circuit 303 performs the DCT for each DCT block corresponding to the DCT mode selected by the DCT mode selecting circuit 302 and generates DCT coefficients. The generated DCT coefficients are supplied to the quantizing circuit 304.

The DCT coefficients that are output from the DCT circuit 303 are quantized by the quantizing circuit 304. The quantizing circuit 304 has a quantizer scale register (not shown) that stores quantizer scale values (quantizer_scale). With the quantizer scale values stored in the quantizer scale value register, the quantizing circuit 304 quantizes DCT coefficients. At that point, the rounding accuracy of DCT coefficients that are quantized is varied corresponding to a quantizer scale value. As a result, DCT coefficients are quantized corresponding to a characteristic of a picture.

An output of the quantizing circuit 304 is supplied to the VLC circuit 305. The VLC circuit 305 encodes the quantized DCT coefficients with the variable length code and outputs the encoded data as an MPEG ES.

Next, the process of the quantizing circuit 304 will be described in detail. As a basic process, the quantizing circuit 304 weights coefficients of one DCT block composed of eight pixels× eight lines with pre-designated weighting coefficients (Intra_Quantizer_Matrix) and divides the weighted coefficients by a quantizer scale value (quantizer_scale). As a result, the DCT coefficients are quantized. When the DCT coefficients are quantized, a rounding process is performed with a rounding accuracy corresponding to a quantizer scale value as will be described in the following.

Figure 3:
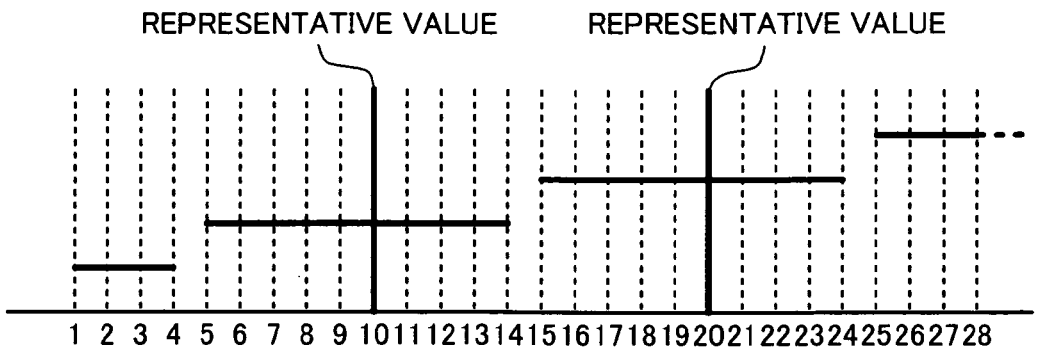
FIG. 3 is a schematic diagram showing a rounding process in the case that quantizer_scale=10 and rounding accuracy is based on the four cut and five count rounding method.
Figure 4:
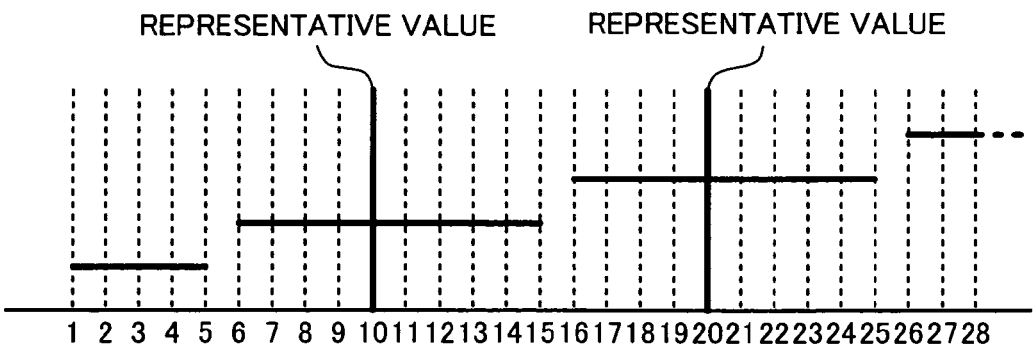
FIG. 4 is a schematic diagram showing a rounding process in the case that quantizer_scale=10 and rounding accuracy is based on the five cut and six count rounding method.
Figure 5:
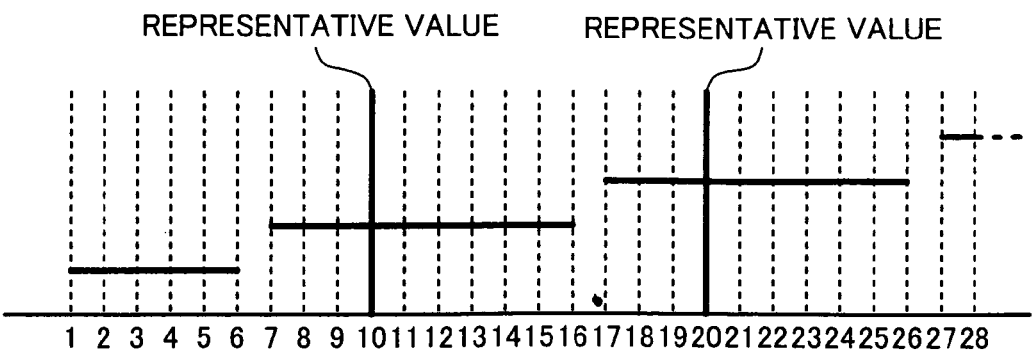
FIG. 5 is a schematic diagram showing a rounding process in the case that quantizer_scale=10 and rounding accuracy is based on six cut and seven count rounding method.

Next, a rounding accuracy will be described in brief. FIG. 3 shows a rounding process in the case that quantizer_scale=10 and rounding accuracy is based on the four cut and five count rounding method. From every 10 numeric values on the horizontal axis, the sixth value is selected as a representative value. For example, the representative value of numeric values between 5 and 14 is 10. In other words, any numeric value between 5 and 14 is rounded to 10. FIG. 4 shows a rounding process in the case that quantizer_scale=10 and rounding accuracy is based on the five cut and six count rounding method. From every 10 numeric values on the horizontal axis, the fifth value is selected as a representative value. For example, the representative value of numeric values between 6 and 15 is 10. In other words, any numeric value between 6 and 15 is rounded to 10. FIG. 5 shows a rounding process in the case that quantizer_scale=10 and rounding accuracy is based on the six cut and seven count rounding method. From every 10 numeric values on the horizontal axis, the fourth value is selected as a representative value. For example, the representative value of numeric values between 7 and 16 is 10. In other words, any numeric value between 7 and 16 is rounded to 10.

In FIG. 3 to FIG. 5, it can be said that the rounding accuracy shown in FIG. 5 is larger in the round off direction than the rounding accuracy shown in FIG. 3. In addition, it can be said that a rounding accuracy is a threshold value with which round-down and round-up of a value is controlled when it is quantized.

The quantizing circuit 304 designates a rounding accuracy corresponding to the forgoing quantizer scale value and quantizes coefficients with the designated rounding accuracy. Thus, a quantizing process is optimally performed corresponding to a characteristic of a picture. As a result, when a picture is compressed, the deterioration of the quality thereof can be suppressed. In other words, when a picture can be easily compressed, the quantizer scale value becomes small. In contrast, when a picture cannot be easily compressed, the quantizer scale value becomes large. Thus, the quantizing process is performed with an optimum rounding accuracy corresponding to the quantizer scale value.

Next, a calculation for a process for varying a rounding accuracy corresponding to the forgoing quantizer scale will be described. In this calculation, AC coefficients (v, u) of DCT coefficients that have been transformed by the DCT are quantized using formulas (1) and (2). As a result, quantized DCT coefficients QF (v, u) are obtained.

$$wF(v,u)=16 \times F(v,u)/W(v,u) \quad (1)$$

$$QF(v,u)=[wF(v,u)+\{\text{sign }(wF(v,u))\times \{M\times \text{quantizer\_scale}\}\}\text{div } 32]\text{div quantizer}_{13}\text{ scale} \quad (2)$$

In the example, (v, u) represents coordinates of coefficients of a DCT block. As shown in FIG. 6, W (v, u) represents weighting coefficients (Intra_Quantizer_Matrix) of coefficients. The weighting coefficients are provided as initial values of the MPEG2. Operator "div" represents a dividing operation with decimal part rounded off. Numeric values [16] and [32] in formulas (1) and (2) are conveniently used for bit-shifts of numeric values in the forgoing calculation.

Operator "sign" represents the following cases. In the example, for convenience, the operator "sign" is expressed in C language, which is a programming language used for computers.

| | |
|---|---|
| if (x > 0) | sign (x) = 1; |
| else if (x == 0) | sign (x) = 0; |
| else if (x < 0) | sign (x) = −1; |

In other words, when wF (v, u) is larger than 0, sign {wF (v, u)} is calculated as [1]. When wF (v, u) is [0], sign {wF (v, u)} is calculated as [0]. When wF *v, u) is smaller than 0, sign {wF (v, u)} is calculated as [−1].

In addition, value M in formula (2) is a parameter with which a rounding accuracy is designated for each quantizer scale (quantizer_scale) value. For example, the value M is designated corresponding to for example formula (3) that follows. In this example, for convenience, formula (3) is expressed in C language, which is a programming language used for computers.

| | | |
|---|---|---|
| if | (quantizer_scale == 1) | M = 16; |
| else if | (quantizer_scale == 2) | M = 15; |
| else if | (quantizer_scale == 3) | M = 14; |
| else if | (quantizer_scale == 4) | M = 13; |
| else if | (quantizer_scale == 5) | M = 12 |
| else if | (quantizer_scale == 6) | M = 11; |
| else | | M = 10; . . . (3) |

In that example, when the value of quantizer_scale is [1], the value M is [16]; when the value of quantizer_scale is [2], the value M is [15]; when the value of quantizer_scale is [3], the value M is [14], and so forth. When the value of quantizer_scale is [7] or larger, the value M is [10]. When the parameter M is varied, a calculation for varying a rounding accuracy corresponding to quantizer_scale is accomplished. In other words, as the value of quantizer_scale (quantizer scale) is small, a rounding accuracy becomes high and coefficients are finely quantized. As the quantizer scale value is large, a rounding accuracy becomes low and coefficients are coarsely quantized. Thus, a rounding accuracy is designated with the value M.

The forgoing combinations of the quantizer scale quantizer_scale and the value M are just examples. Thus, the present invention is not limited to such examples.

By the forgoing calculations, DCT coefficients (v, u) are quantized and then quantized DCT coefficients QF (v, u) are obtained.

Figure 7:
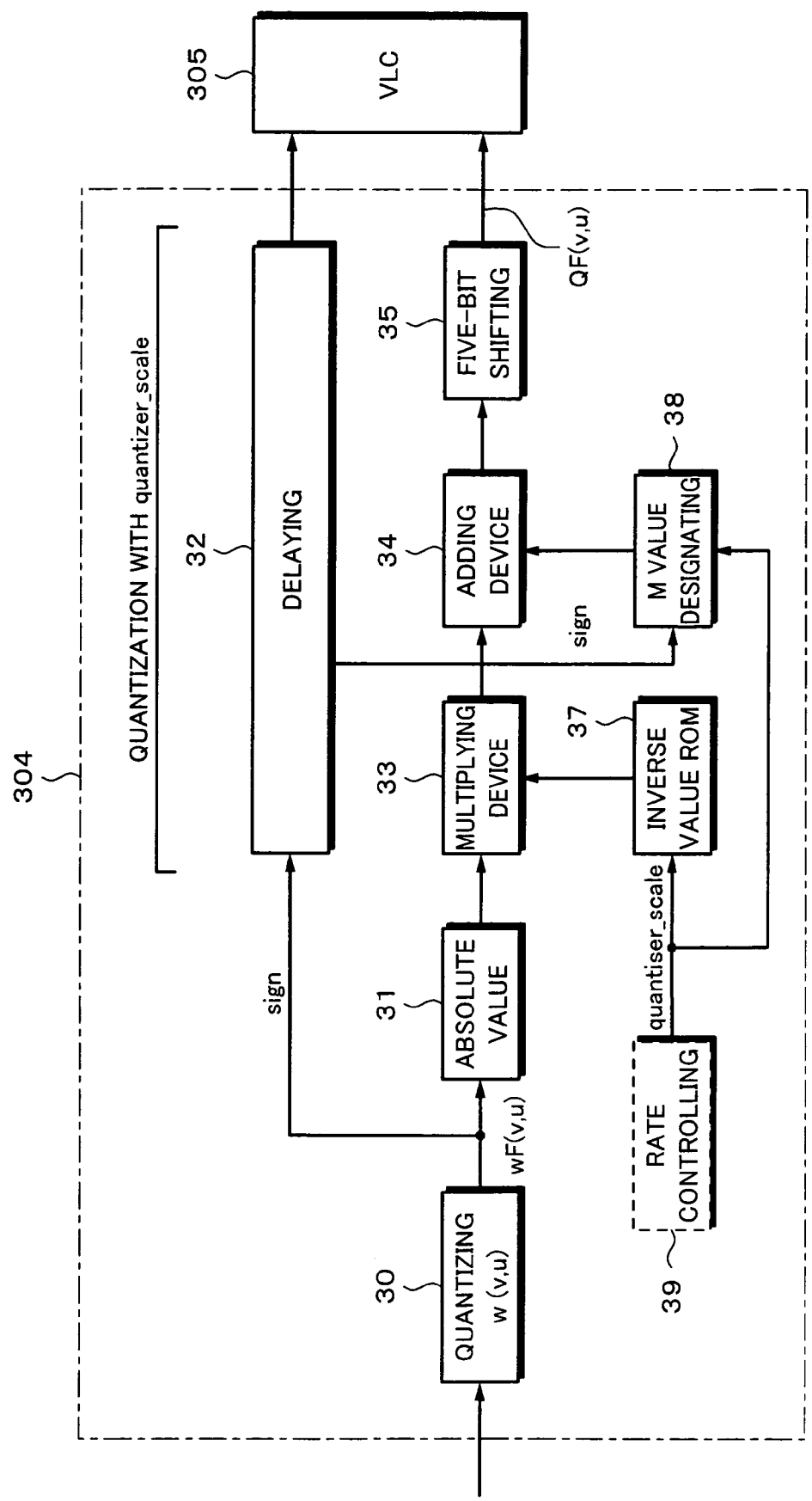
FIG. 7 is a schematic diagram showing a structure of a quantizing circuit.

FIG. 7 shows a structure of an example of the forgoing quantizing circuit 304. First of all, the forgoing formula (2) is modified as formula (4) so as to deal with the structure shown in FIG. 7.

$$QF(v,u)=wF(v,u)/\text{quantizer\_scale}+\text{sign}\{wF(v, u)\}\times M/32 \quad (4)$$

In reality, in formula (2), since the decimal part is rounded off in the division by the operator "div", it is necessary to round off the decimal part of QF (v, u) obtained in formula (4) as int {QF (v, u)}.

DCT coefficients (v, u) that are output from the DCT circuit 303 are supplied to a quantizing circuit 30. Corresponding to formula (1), the quantizing circuit 30 quantizes the DCT coefficients F (v, u) with the quantizer matrix shown in FIG. 6. The quantized result is shifted by four bits by a four-bit shifting circuit (not shown). As a result, [16] is multiplied. The obtained values wF (v, u) are converted into absolute values thereof by an absolute value circuit 31 and supplied to a first input terminal of a multiplying device 33.

In addition, the quantizing circuit 30 determines whether each of the calculated values wF (v, u) is larger than [0]. Corresponding to the determined result, the quantizing circuit 30 obtains values sign {wF (v, u)] in the forgoing manner. The obtained values sign {wF (v, u)} are supplied to a delaying circuit 32.

On the other hand, a quantizer scale quantizer_scale is supplied from a rate controlling portion 39 that is an external structure of the quantizing circuit 304. The quantizer scale is supplied to an inverse value ROM (Read Only Memory) 37 and an M value designating circuit 38. Before quantizing coefficients, the rate controlling portion 39 estimates a generated code amount of quantized coefficients and decides a quantizer scale corresponding to the estimated generated code amount so that the generated code amount for one frame does not exceed a predetermined value.

In the inverse value ROM 37, inverse values corresponding to quantizer scale values have been stored. When a quantizer scale value is input, a corresponding inverse value is output.

The M value designating circuit 38 designates the value M as a parameter with which a rounding accuracy is designated corresponding to the supplied quantizer scale quantizer_scale. The value M is designated with the quantizer scale quantizer_scale corresponding to the forgoing formula (3). In the example, corresponding to formula (4), the value M designated corresponding to the forgoing formula (3) is divided by [32].

Values sign {wF (v, u)} are supplied at predetermined timings from the delaying circuit 32 to the M value designating circuit 38. With the values sign {wF (v, u)}, the sign of the value M is designated to the values wF (v, u). The value M whose sign is designated with the values sign {wF (v, u)} is supplied to a first input terminal of an adding device 34.

The quantizer scale quantizer_scale decided by the rate controlling portion 39 is converted into the inverse value thereof as 1/quantizer_scale by the inverse value ROM 37. The inverse value 1/quantizer_scale is supplied to a second input terminal of the multiplying device 33. The multiplying device 33 multiplies the value that is input from the first input terminal by the value that is input from the second input terminal. As a result, the multiplying device 33 obtains the values wF (v, u)/quantizer_scale. An output of the multiplying device 33 is supplied to a second input terminal of the adding device 34. The adding device 34 adds the values wF (v, u)/quantizer_scale that are output from the multiplying device 33 and the value M/32 supplied from the M value designating circuit 38. An output of the adding device 34 is supplied to a five-bit shifting circuit 35. The five-bit shifting circuit 35 shifts the added results by five bits. As a result, the five-bit shifting circuit 35 round off the decimal parts thereof. Thus, the calculation of formula (4) is performed.

Since the decimal parts are rounded off from the output of the adding device 34 by the five-bit shifting circuit 35, a representative value of which DCT coefficients are quantized with weighting coefficient and rounded with a rounding accuracy corresponding to the value M is obtained.

DCT coefficients QF (v, u) that have been quantized with the rounding accuracy corresponding to the parameter M are output from the five-bit shifting circuit 35 and supplied to the VLC circuit 305. The delaying circuit 32 delays the values sign {wF (v, u)} corresponding to the process times of the absolute value circuit 31, the multiplying device 33, the adding device 34, and the five-bit shifting circuit 35 and supplies the resultant values to the VLC circuit 305. The DCT coefficients QF (v, u) are encoded with the variable length code using the values sign {wF (v, u)} by the VLC circuit 305.

In the forgoing structure, DCT coefficients can be quantized without an increase of the amplitude thereof. As a result, video data can be dubbed with an suppression of an encoding noise, in particular, in consideration of a pixel shifting process.

When a process for decoding encoded picture data, dubbing the decoded picture data, and encoding the dubbed picture data is repeated, the picture quality will deteriorate. To evaluate the picture quality of picture data that has been repeatedly decoded, debugged, and encoded, the pixel shifting process is performed. In the pixel shifting process, while the segmentation of DCT blocks of picture data is varied pixel by pixel, the picture data is dubbed and the deterioration of the picture quality is evaluated. In the pixel shifting process, when the segmentation of DCT blocks is varied, since the structural elements of the DCT blocks are varied, the DCT coefficients that are output by the DCT are varied. Using a method called back search, with a decimal part that takes place in the present quantizing process, the former quantizer scale with which picture data has been quantized can be predicted. However, when the segmentation of DCT blocks is varied and they are encoded, using the back search method, the past quantizer scale value cannot be predicted. In the pixel shifting process, picture data that is encoded by varying the segmentation of the DCT blocks is connected as the entire picture. The difference between the resultant picture and the original picture is measured. With the measured result, the deterioration of the picture quality of the picture data that has been encoded can be evaluated.

In addition, according to the forgoing embodiment, a rounding accuracy of coefficients that are quantized is controlled corresponding to a quantizer scale quantizer_scale. On the other hand, a quantizer scale is controlled corresponding to the estimated result of the generated code amount by the rate controlling portion 39 so that the quantizer scale value of a picture that can be easily compressed is small and that the quantizer scale value of a picture that cannot be easily compressed is large. According to the forgoing embodiment, the rounding accuracy is controlled so that as the quantizer scale value becomes large, the round off direction becomes large. In other words, as the quantizer scale value becomes large, the value M becomes small. Thus, the decimal parts are largely rounded off from the values QF (v, u).

Thus, corresponding to a characteristic of a picture, a rounding accuracy of coefficients that are quantized is properly designated. Thus, the coefficients can be properly quantized. As a result, when a picture compressing process is performed for a picture, the deterioration of the picture quality thereof can be suppressed to a minimum.

The forgoing quantizing circuit 304 can be implemented by software installed on a computer apparatus. The value M as a parameter of a rounding accuracy designated as formula (3) is stored in a memory. The forgoing formulas (1), (2), and (3) can be easily implemented by software. The software is provided as a recording medium such as a CD-ROM (Compact Disc—Read Only Memory). When the program is installed on the computer apparatus, the program can be executed thereon. Since the structure of the computer apparatus is well known, the description will be omitted.

In the forgoing embodiment, the MPEG2 system of which a picture is transformed by the DCT block by block is used. However, the present invention is not limited to such an example. In other words, as long as an encoding system that encodes picture data block by block is used, the present invention can be applied to the encoding system.

In addition, in the forgoing embodiment, a digital VTR was described. However, the present invention is not limited to such an example. In other words, the present invention can be applied to another picture processing apparatus that compression-encodes picture data using a block encoding method for example a picture transmitting apparatus that compression-encodes picture data to be transmitted.

As was described above, according to the forgoing embodiment, when DCT coefficients are quantized, a rounding accuracy of DCT coefficients that are quantized is controlled according to a quantizer scale value. Thus, a rounding accuracy of DCT coefficients that are quantized can be used corresponding to a characteristic of a picture. As a result, DCT coefficients can be optimally quantized corresponding to a characteristic of a picture.

Thus, corresponding to the characteristic of the picture, the encoding noise can be effectively suppressed. As a result, the deterioration of the picture quality of the picture that is compressed can be suppressed to a minimum.

The invention claimed is:

1. A quantizing apparatus, comprising:
    rounding accuracy designating means for dynamically varying a rounding accuracy by designating a quantizer threshold value in multiple steps according to a designated quantizer scale value, the quantizer scale value based on a characteristic of a picture signal; and
    quantizing means for quantizing the picture signal based on the designated quantizer scale value and the quantizer threshold value designated by the rounding accuracy designating means,
    wherein the rounding accuracy is dynamically varied by designating a quantizer threshold value based upon the characteristic of the picture signal.

2. The quantizing apparatus as set forth in claim 1,
    wherein the rounding accuracy designating means increases probability of which the quantizer threshold value is rounded off as the quantizer scale value becomes large.

3. The quantizing apparatus as set forth in claim 1, further comprising:
    block segmenting means for segmenting the picture signal into blocks;
    transforming means for performing a transforming process for each block of the picture signal segmented by the block segmenting means and outputting transformed coefficients; and
    quantizer scale value designating means for designating a quantizer scale value with which the transformed coefficients that are output from the transforming means are quantized,
    wherein the quantizing means performs quantization with the quantizer scale value designated by the quantizer scale value designating means.

4. The quantizing apparatus as set forth in claim 1, further comprising:
    encoding means for encoding a representative value quantized by the quantizing means with a variable length code.

5. A quantizing method, comprising the steps of:
    dynamically varying a rounding accuracy by designating a quantizer threshold value in multiple steps according to a designated quantizer scale value, the quantizer scale value based on a characteristic of a picture signal; and
    quantizing the picture signal based on the designated quantizer scale value and the quantizer threshold value designated at the rounding accuracy designating step,
    wherein the rounding accuracy is dynamically varied by designating a quantizer threshold value based upon the characteristic of the picture signal.

6. A computer-readable medium having recorded thereon a quantizing program for causing a computer apparatus to execute a quantizing method for quantizing a picture signal, the quantizing method comprising the steps of:
    dynamically varying a rounding accuracy by designating a quantizer threshold value in multiple steps according to a designated quantizer scale value, the quantizer scale value based on a characteristic of a picture signal; and
    quantizing the picture signal based on the designated quantizer scale value and the quantizer threshold value designated at the rounding accuracy designating step,
    wherein the rounding accuracy is dynamically varied by designating a quantizer threshold value based upon the characteristic of the picture signal.

* * * * *